May 19, 1970  G. P. KENNEDY ET AL  3,512,787

FLOATING SEAL PACKING ASSEMBLY

Filed Sept. 6, 1967

Garth P. Kennedy
William A. Kennedy, Jr.
INVENTORS

United States Patent Office 3,512,787
Patented May 19, 1970

3,512,787
FLOATING SEAL PACKING ASSEMBLY
Garth P. Kennedy and William A. Kennedy, Jr., Oklahoma City, Okla., assignors to Corken Pump Company, a corporation of Oklahoma
Filed Sept. 6, 1967, Ser. No. 665,903
Int. Cl. F16j 15/18
U.S. Cl. 277—4                    6 Claims

ABSTRACT OF THE DISCLOSURE

A pressure sealing assembly for reciprocating rods projecting from a fluid containing housing on which a stuffing box is fixedly mounted. A packing cartridge is mounted on the rod within the stuffing box with sufficient radial clearance to accommodate any lateral displacement thereof with the rod during its reciprocatory stroke. Flexible packing elements are stacked in the cartridge under the axial bias of a spring to also clamp a sealing gasket between the cartridge and the housing wall preventing leakage from the wall opening through which the rod extends.

---

This invention relates to pressure sealing packing assemblies for reciprocating members such as piston rods and other reciprocating elements or plungers.

The purpose of any sealing assembly for reciprocating members is to prevent leakage of a fluent medium from the housing enclosing the reciprocating mechanism. Thus, sealing must be placed about the reciprocating rod adjacent the opening in the housing through which the rod extends. Inasmuch as it is impossible to avoid some lateral movement of the rod during its reciprocatory stroke, the sealing assembly must compensate and/or adjust for such lateral movement in order to continuously seal the housing against leakage. The sealing assembly in performing its primary function of preventing leakage, must however take into account the frictional resistance that it exerts on the reciprocating rod, the heat concentration resulting from such resistance and wear of the materials in wiping contact with the reciprocating rod.

One basic method of sealing a reciprocating rod, is to employ soft packing enclosed within a cavity or stuffing box fixedly mounted on the housing in surrounding relation to the rod. The soft packing material usually in the form of rings are maintained in wiping contact with the rod and with the walls of the stuffing box by compression exerted thereon by a packing gland. While such sealing methods are relatively low in cost, they require constant attention because of excessive wear and friction on the piston rod. Thus, any attempt to compensate for wear by increasing the pressure exerted on the flexible or soft packing elements, increases the frictional resistance and the damaging effect of heat concentration so that this sealing method has severe limitations.

In another type of sealing method, less flexible packing rings are utilized for wiping engagement with the reciprocating rod, arranged to be laterally displaced with the rod so as to avoid the problems of wear. However, the latter method involves precision machining of the packing rings to exactly fit the rod as well as precision machining of flat surfaces against which the packing rings must seal and a relatively larger space within which to house the packing rings and assemble the components necessary to form the sealing assembly. Thus, the precision required, the special materials involved as well as the space requirements limit the use of the latter sealing method to relatively large, expensive machines. Also, sealing assemblies of the latter type are not suitable for mass production purposes, small machines and unskilled field servicing.

In accordance with the present invention, a sealing assembly is provided having the advantages associated with the two aforementioned basic sealing methods. Thus, the sealing assembly of the present invention may be readily made from available components or by mass production methods generally not compatible with precision machining of parts. Nevertheless, the sealing assembly of the present invention avoids the problems of wear or excessive frictional resistance heretofore encountered in connection with low cost sealing assemblies. The present sealing assembly thus utilizes soft packing confined within a floating retainer cup which is enclosed with sufficient radial clearance in a stuffing box to accommodate its lateral displacement with reciprocating rod on which it is mounted in substantially coaxial relation. The soft packing within the retainer cup is maintained under axial compression by a spring arrangement which also clamps a sealing gasket between the retainer cup and the wall of the housing in order to prevent leakage or loss in pressure or vacuum. Since the soft packing which may be in the form of flexible V-shaped rings does not contact the internal walls of the stuffing box, the rings need not be under a high axial pressure for maintaining sealing contact with the reciprocating rod inasmuch as the packing elements simply move laterally with the reciprocating rod. Any normal wear of the packing elements will be self-adjusted by the pressure of the spring so as to avoid the necessity for manual adjustment of a packing gland as in prior arrangements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
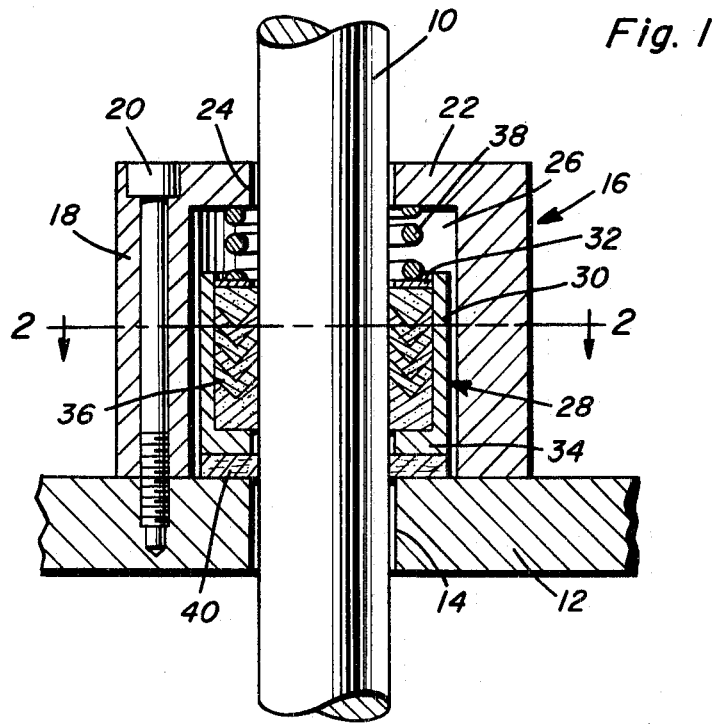
FIG. 1 is a side sectional view through a typical sealing assembly for a reciprocating rod constructed in accordance with the present invention.
Figure 2:
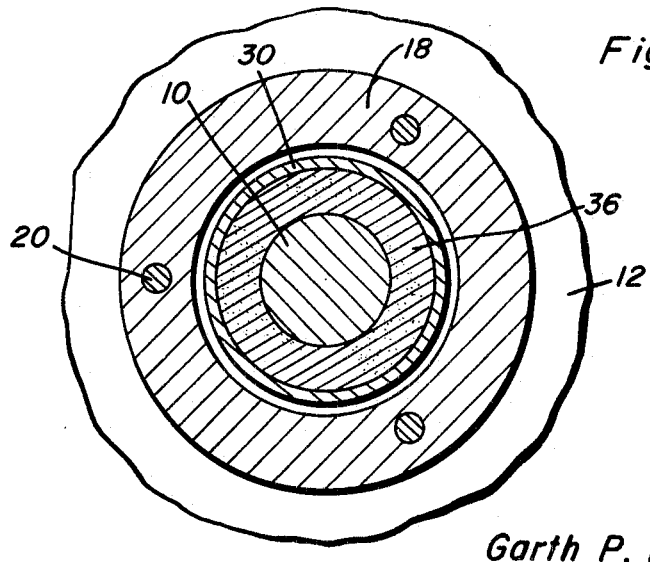
FIG. 2 is a transverse sectional view taken substantially through a plane indicated by the section line 2—2 in FIG. 1.

Referring now to the drawings in detail, it will be observed that a reciprocating member such as a piston rod 10 extends along a longitudial axis through the retaining wall 12 of a housing. An opening 15 is accordingly formed in the wall 12 having a loose fit about the rod 10 so as to accommodate its reciprocatory movement as well as the small lateral motion associated with any reciprocating mechanism. Thus, in order to seal the housing to prevent leakage of fluent medium therefrom or seal the housing against pressure from either side, a pressure sealing assembly generally referred to by reference numeral 16 is mounted on the housing wall in surrounding relation to the reciprocating rod 10.

The sealing assembly includes a stuffing box 18 fixedly mounted on one side of the wall 12 by a plurality of fastener assemblies 20. The stuffing box is provided with an end wall 22 having an opening 24 aligned with the opening 14 in the wall 12 through which the reciprocating rod 10 extends with a loose fit. An annular cavity 26 is accordingly enclosed within the stuffing box about the reciprocating rod within which a floating packing cartridge 28 is disposed.

The cartridge 28 includes a rigid packing cup 30 having an outer diameter dimensioned to provide sufficient radial clearance relative to the internal diameter of the stuffing box in order to accommodate a certain amount of lateral movement of the cartridge 28 with the reciprocating rod. The packing cup is opened at one axial end so as to slidably mount an annular washer 32 having an opening through which the reciprocating rod 10 extends with radial clearance. The opposite axial end of the packing cup is provided with a retainer wall 34 so as to confine a plurality of flexible packing rings 36 which are V-shaped in annular cross-section. These packing rings are provided with radially inner lips that are in wiping contact with the external surface of the reciprocating rod while the radially outer lips engage the internal surface of the packing cup 30. Accordingly, when axial pressure is applied to the rings stacked against the retainer wall 34, the radially inner and outer lips thereof will wipingly engage the reciprocating rod and the relatively non-reciprocating packing cup 30. However, inasmuch as the packing cup is floatingly mounted within the stuffing box, it will be laterally displaced with the reciprocating rod so as to avoid wear. In this regard, it should be appreciated that if the packing rings were engaged with the internal walls of the fixed stuffing box, the lateral movement of the rod as it reciprocates, will produce an elliptical wear pattern on the radially inner lips of the packing rings which can only be compensated for by additional axial pressure exerted longitudinally along the axis of the reciprocating rod thereby increasing the frictional resistance and development of damaging heat. By avoiding such an arrangement, a relatively lower axial pressure may be exerted on the flexible packing rings 36.

Axial pressure is applied to the packing rings through the thrust washer 32 by means of a coil spring 38 mounted about the reciprocating rod and reacting against the end wall 22 of the stuffing box. The axial force of the spring 38 is also transmitted through the floating cartridge 28 to a sealing ring gasket 40 which is clamped between the wall 12 and the retainer wall 34 of the floating cartridge so as to pressure seal the opening 14.

It will be apparent that the cartridge 28 may be installed by assembly line methods or in the field with a minimum of attention or skill. Further, the packing rings 36 may be molded from standard dies and made from standard filled Teflon material for maximum chemical resistance and frictionless contact surfaces. The low cost involved in fabricating the sealing assembly of the present invention, and its reduced space requirements renders it universal in application by selection of materials for the spring, housing and gasket, appropriate for any particular installation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a reciprocating member extending through an opening in a retaining wall along a longitudinal axis, a sealing assembly comprising a stuffing box fixed to said wall forming an annular enclosure about the reciprocating member, a packing cup floatingly disposed within the annular enclosure, soft packing elements confined within the packing cup in contact with the reciprocating member supporting the packing cup in substantially coaxial relation thereon, a sealing ring mounted in wiping engagement on the reciprocating member axially between the packing cup and the retaining wall and spring means mounted in the stuffing box externally of the packing cup and axially engaging the packing elements for exerting sealing pressure through the packing elements on the sealing ring.

2. The combination of claim 1 including a washer slidably mounted within the packing cup in axial engagement with the packing elements and a coil spring engaging the washer on an axial side of the packing cup opposite the sealing ring.

3. The combination of claim 2 wherein said packing cup includes a cylindrical portion enclosing the packing elements and an end flange abutting the sealing ring through which the reciprocating member extends.

4. The combination of claim 1 wherein said packing cup includes a cylindrical portion enclosing the packing elements and an end flange abutting the sealing ring through which the reciprocating member extends.

5. The combination of claim 4 including a washer slidably mounted within the packing cup in axial engagement with the packing elements, said spring means including a coil spring engaging the washer on an axial side of the packing cup opposite the sealing ring.

6. In combination with a reciprocating member extending through an opening in a retaining wall along a longitudinal axis, a sealing assembly comprising a stuffing box fixed to said wall forming an annular enclosure about the reciprocating member, packing means mounted on the reciprocating member for lateral displacement therewith within the annular enclosure transverse to said longitudinal axis, a floating retainer enclosing the packing means, pressure exerting means engaging in the stuffing box externally of the retainer for axially compressing the packing means within the retainer to maintain the packing means in wiping engagement with the reciprocating member and a sealing gasket axially clamped between the retaining wall and the floating retainer in wiping engagement with the reciprocating member.

References Cited
UNITED STATES PATENTS

| | | | |
|---|---|---|---|
| 877,706 | 1/1908 | Duffy | 277—97 |
| 1,088,737 | 3/1914 | Soderlund | 277—98 X |
| 2,119,244 | 5/1938 | Pranger | 277—97 X |
| 2,567,479 | 7/1951 | Hebard | 277—102 X |
| 3,013,830 | 12/1961 | Milligan | 277—124 X |

SAMUEL ROTHBERG, Primary Examiner

U.S. Cl. X.R.

277—99, 124